Sept. 20, 1927.

F. T. FARMER

BALL RACE

Filed Feb. 27. 1925

1,643,156

Inventor
Frank T. Farmer
By John Boyle Jr
Attorney

Patented Sept. 20, 1927.

1,643,156

UNITED STATES PATENT OFFICE.

FRANK T. FARMER, OF DETROIT, MICHIGAN, ASSIGNOR OF ONE-HALF TO ROBERT E. FARMER, OF NEW YORK, N. Y.

BALL RACE.

Application filed February 27, 1925. Serial No. 12,002.

My invention relates to ball bearings particularly adapted for use in connection with the revolving knives of lawn mowers. The bearings of the revolving knives of a lawn mower must be kept tight in order that the knives may function properly by forming a cutting or shearing contact with the stationary knife. If the bearing is loose, the blades of the revolving knife will lift up off of the stationary knife and thus prevent them from cutting.

One of the objects of my invention is to provide a ball bearing that will permit of an end movement of the shaft, without changing the alinement of the shaft, or the close fitting of the balls between the male and female races.

Another object is to provide a ball bearing for lawn mowers that will permit a slight shifting of the end frames that contain the housing of the ball bearing without loosening the close adjustment of the ball contact between the male and female races.

A still further object is to provide a simple and easy means for taking up the wear of the balls and races, so as to keep the balls tight within the races and consequently prevent any play of the shaft in its bearings.

Yet another object is to provide a ball bearing, that in case the bearing at one end of the shaft becomes loose, it will have no effect upon the adjustment of the bearing at the other end of the shaft.

In order that my invention may be better understood, I shall point out the insufficiencies of the type of ball bearings now in general use on lawn mowers.

As stated before a lawn mower reel, or the revolving knives, in order to function properly must be tight in its bearings. The usual form of ball bearings used for reel bearings in lawn mowers, is what is termed the three point contact bearings. That is, a cone is mounted on the reel shaft and a cup is mounted in the housing of the end frame. The balls mounted in suitable retainers are placed in the cup and the cone inserted against the balls. The contact of the balls on the cone and cup is just a single point, and affords the smallest possible wearing surface. The diameter of the cone contact point being much smaller than the contact point in the cup, the cone bearing wears faster. The slightest wear of any of the ball contact points of the male or female races, causes considerable looseness of the reel shaft in its bearings, and affects the bearings at both ends of the reel shaft alike, whereupon the mower fails to cut properly. If the end frame which carries the female race becomes loose and changes position—no matter how slight—from the original setting, the reel becomes loose in its bearings at both ends, when three point contact ball bearings are used.

Referring now to the drawings for a more complete disclosure of the invention:

Figure 1:
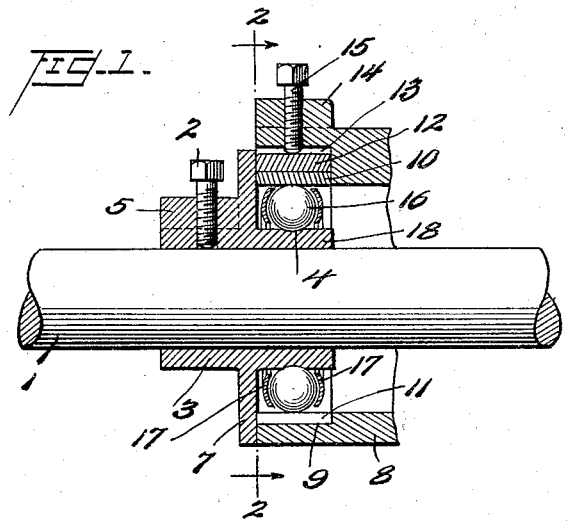
Figure 1 is a section of the bearing longitudinally of the shaft.
Figure 2:
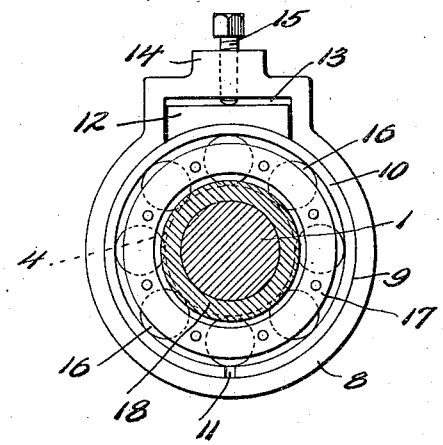
Fig. 2 is a section on the line 2—2 of Fig. 1.

Adapted to be secured to the revolving knife shaft 1 by means of the set screw 2, passing through the boss 5, is the male bearing 3, provided with the race way 4, and a flange 7 which fits against the outer end of the housing 8 to seal the bearing against entrance of dirt as well as to form a thrust collar which will prevent end play in the shaft.

The housing 8 represents a portion of the end frame of a lawn mower and is provided with a chamber 9 which is adapted to receive the female ball race 10 which is in the form of a ring, split at 11, so that its diameter can be changed through the medium of the compressor clamp 12 which fits in a recess 13 of the said housing. The housing 8 is provided with a boss 14 through which a set screw 15 is threaded and which engages the said compressor clamp to vary the diameter of the female ball race.

The balls 16 are held in the customary ball retaining ring 17.

In practice, the housing 8 is bored to receive the female race 10 which is pressed into position, with the slot 11 opposite the recess 13. The compression clamp 12 is then placed in the recess 13 and the set screw 15 is screwed down on the said clamp to secure it in position. The groove 4 of the male bearing is turned to the correct diameter so that when the balls are placed in position therein, they will just fit in the inside circle of the female race. The hub 18 is made of such a size as will permit the balls to just pass over it, when they are expanded as far as the loose fit of the ball retainer will permit.

Any play that may be found, due to the balls not fitting tight between the male and female race, can be taken up by screwing the set screw 15 down on the compressor clamp, to contract the diameter of the female race, until the balls fit close in the groove 4.

The load on the shaft in a bearing is always at some fixed point. The slot 11 is located in the housing opposite to the point of application of the resultant load. When a ball is passing over the slot 11, the two adjacent balls will steady the male bearing should it be required, and the slot in the female race will have no effect upon the perfect smooth running of the bearing.

It will be apparent that if the male race should separate from the housing due to the end frame of the mower becoming loose and spreading apart, the balls can change their position in the female race, but their position in the male race would not be affected. Any looseness of the balls in the bearing at one end of the shaft will have no effect on the adjustment of the ball bearing at the other end of the reel shaft.

From the above description it will be apparent that I have produced a device of the character described, which possesses all the features enumerated as desirable, and while I have illustrated and described the preferred form of the invention, it will be understood that I reserve the right to all changes properly falling within the scope and spirit of the appended claims.

Therefore what I claim as new and desire to secure by Letters Patent, is:—

1. A ball bearing comprising an inner race, means for securing the said race to a shaft, an outer race, means for securing the outer race to a stationary housing, balls interposed between the said races, a groove in the inner race to hold the said balls against endwise movement, the surface of the outer race permitting endwise movement relative to said balls.

2. A ball bearing comprising an inner race, means for securing the said race to a shaft, an outer race, means for securing the outer race to a stationary housing, balls interposed between the said races, a groove in the inner race to hold the said balls against endwise movement, the surface of the outer race permitting endwise movement relative to said balls, a thrust collar limiting end movement of the shaft in one direction.

3. A ball bearing comprising an inner race, means for securing the said race to a shaft, an outer race, means for securing the outer race to a stationary housing, balls interposed between the said races, the said outer race comprising a split ring, the split in the ring being placed opposite the point carrying the load, and means for closing the ring to reduce its diameter and thereby make the balls fit close to the inner race, a groove in the inner race to hold the said balls against endwise movement, the surface of the outer race permitting endwise movement relative to said balls.

4. A ball bearing comprising an inner race, means for securing the said race to a shaft, an outer race, means for securing the outer race to a stationary housing, balls interposed between the said races, the said outer race comprising a split ring, the split in the ring being placed opposite the point carrying the load, and means for closing the ring to reduce its diameter and thereby make the balls fit close to the inner race, a groove in the inner race to hold the said balls against endwise movement, the surface of the outer race permitting endwise movement relative to said balls, and a thrust collar limiting end movement of the shaft in one direction.

In testimony whereof I hereunto affix my signature.

FRANK T. FARMER.